United States Patent
Das et al.

(10) Patent No.: US 9,542,456 B1
(45) Date of Patent: Jan. 10, 2017

(54) AUTOMATED NAME STANDARDIZATION FOR BIG DATA

(71) Applicant: EMC Corporation, Hopkinton, MA (US)

(72) Inventors: Kaushik Das, Belmont, CA (US); Jarrod J. Vawdrey, Redwood City, CA (US); Robert J. Eckhardt, Brooklyn, NY (US); Yu Zhang, Stamford, CT (US)

(73) Assignee: EMC Corporation, Hopkinton, MA (US)

( * ) Notice: Subject to any disclaimer, the term of this patent is extended or adjusted under 35 U.S.C. 154(b) by 390 days.

(21) Appl. No.: 14/145,859

(22) Filed: Dec. 31, 2013

(51) Int. Cl.
  *G06F 17/30* (2006.01)
  *G06F 11/18* (2006.01)

(52) U.S. Cl.
  CPC ....... *G06F 17/30542* (2013.01); *G06F 11/188* (2013.01); *G06F 17/30929* (2013.01); *G06F 17/30985* (2013.01); *G06F 2207/025* (2013.01)

(58) Field of Classification Search
  CPC  G06F 17/30985; G06F 9/444; G06F 17/2735; G06F 17/277; G06F 17/2785; G06F 17/2705; G06F 17/30542; G06F 11/188; G06F 17/30929; Y10S 707/99936
  USPC ......................................................... 707/780
  See application file for complete search history.

(56) References Cited

U.S. PATENT DOCUMENTS

| | | | | |
|---|---|---|---|---|
| 6,018,735 A * | 1/2000 | Hunter | .............. | G06F 17/30985 |
| 6,169,999 B1 * | 1/2001 | Kanno | ................ | G06F 17/2735 |
| | | | | 704/10 |
| 8,086,442 B1 * | 12/2011 | Wu | ..................... | G06F 17/2229 |
| | | | | 704/1 |
| 8,375,026 B1 * | 2/2013 | Elliott | ............... | G06F 17/30702 |
| | | | | 707/728 |
| RE44,722 E * | 1/2014 | Wu | .................................. | 704/1 |
| 8,631,097 B1 * | 1/2014 | Seo | ................... | G06F 17/30905 |
| | | | | 709/203 |
| 2004/0002850 A1 * | 1/2004 | Shaefer, Jr. | .......... | G06F 17/273 |
| | | | | 704/5 |
| 2004/0162826 A1 * | 8/2004 | Wyschogrod | ..... | G06F 17/30985 |
| 2004/0225999 A1 * | 11/2004 | Nuss | ......................... | G06F 8/31 |
| | | | | 717/114 |
| 2007/0198600 A1 * | 8/2007 | Betz | .................. | G06F 17/30533 |
| 2009/0037174 A1 * | 2/2009 | Seltzer | ............... | G10L 15/1815 |
| | | | | 704/251 |
| 2010/0174528 A1 * | 7/2010 | Oya | ..................... | G06F 17/2735 |
| | | | | 704/10 |
| 2011/0209185 A1 * | 8/2011 | Cho | ................... | H04N 7/17318 |
| | | | | 725/93 |
| 2012/0066214 A1 * | 3/2012 | Nelke | ..................... | G06F 17/10 |
| | | | | 707/723 |
| 2012/0102055 A1 * | 4/2012 | Hu | .................... | G06F 17/30516 |
| | | | | 707/754 |

(Continued)

*Primary Examiner* — Thanh-Ha Dang
(74) *Attorney, Agent, or Firm* — Barry N. Young (57) ABSTRACT

Distinct names of merchant entities in a transaction processing database are automatically corrected to standard names of entities by identifying non-standard features from the distinct names that do not uniquely identify the standard names of entities, and processing each distinct name with a selected regular expression tailored to remove the non-standard features and convent the names to a standard name format. Fuzzy matching is used to identify standard names of entities corresponding to the standard name formats.

18 Claims, 5 Drawing Sheets

Original: GIANT FOOD #089

Features:
Length: 14
1st White Space: 6
1st Special Characters: 12
1st Digit: 13

Stage 1

Regex:
[^(?-i)a-z]
Remove all numbers (0-9), white space, & special characters

Stage 2

Fuzzy Matching:
1016 (count of GIANTFOOD matches)

Stage 3

Rule Override:
None

Stage 4

Final Results:
GIANTFOOD

Original: PETSMART INC 1963

Features:
Length: 17
1st White Space: 9
Business Suffix: 10
1st Digit: 14

Regex:
[^(?-i)a-z]( INC )$
Remove all numbers (0-9), white space, special characters, & remove business suffix Fuzzy Matching:
<170 PETSMART Count (Not run)

Rule Override:
None

Final Results:
PETSMART (56) References Cited

U.S. PATENT DOCUMENTS

| | | | |
|---|---|---|---|
| 2013/0262080 A1* | 10/2013 | Marciano | G06F 17/2836 704/3 |
| 2013/0297634 A1* | 11/2013 | Shami | G06F 17/273 707/758 |
| 2014/0019458 A1* | 1/2014 | Walton | G06F 17/3053 707/748 |
| 2014/0358971 A1* | 12/2014 | Aminzade | G06F 17/3064 707/780 |

* cited by examiner

Figure 1

| WALMART | PAYPAL | STARBUCKS |
|---|---|---|
| WALMART PORTRAITS 23093 | PAYPAL *SACCAR.COM | STARBUCKSSTORE.COM-USD |
| WAL-MART #2366 SE2 | PAYPAL *BRICKSUPPLY | STARBUCKS CORP00034488 |
| WAL-MART STORE#1041 | PAYPAL *BRETT2010FL | SS-STARBUCKS |
| WAL-MART SUPERCENTER 20 | PAYPAL *UNITED | T1 STARBUCKS J10431542 |
| WAL MART LINCOLN | PAYPAL *TL5354 | STARBUCKS C #112201505 |
| WALMART.COM RELOAD | PAYPAL *CAR-KIT.COM | STARBUCKS WEST30081525 |
| ⋮ | ⋮ | ⋮ |

Totals:   5,057           203,712          11,285

AUTOMATED NAME STANDARDIZATION FOR BIG DATA

BACKGROUND

This invention relates generally to computer implemented methods and systems for automatically standardizing data items that refer to the same thing but which appear in different distinct non-standard forms and formats in data collections, and more particularly to the automated standardization of unstructured non-standard names in big data databases.

Frequently, data items that refer to a common thing or to related entities of a group can appear in many different non-standard distinct forms in one or more collections of data. This occurs in many different areas and different kinds of data, including, for example, in transaction-related data in a relational database. Non-standard unstructured data items cause problems for automated data processing operations that run analytics on the database seeking to make associations between data items or to derive information from the data. They are particularly acute with regard to proper names that are used to identify entities, such as persons or businesses, because the names are unstructured and not standardized across single business entities. Names referring to the same entity may be spelled differently, may contain truncated or shortened words, and may contain special alphanumeric characters. For instance, a business named ACMEMART may appear in a database in many different forms such as "ACME MART", "ACMEMART, INC." or "Acme-Market", and if the business has stores in different locations or has separate departments in stores that are separate cost centers, each store or department may be designated separately, e.g., "ACMEMART #0267".

For analytics processing that requires a global view of an entire business, individual level labeling (non-standard naming) is limiting and requires pre-processing of the data to identify and aggregate the various names into a standardized format for processing. Typically, preprocessing is a manual operation to verify name assignment and correct for obscure or outlier differences. For small and conventional sized data sets, and for data that is not rapidly changing, this may be practical. However, for "big data" sets, and particularly for transactional data, such pre-processing is burdensome and may be impractical if not impossible. "Big Data" refers to large complex collections of data sets having a volume, velocity, and a variety that exceeds an organization's traditional storage or computing capacity for accurate and timely decision making. For some organizations, big data may be data exceeding hundreds of gigabytes. For others, it may be tens or hundreds of terabytes. Big data is difficult to work with using most relational database management systems and statistics and visualization packages. Instead, it may require massively parallel software running on tens, hundreds, or even thousands of servers.

It is desirable to provide systems and methods that can preprocess and automatically standardize data items, such as names, in a database to associate data items having distinct non-standard forms and formats to a common standard format so that the data can be aggregated, queried and analyzed to determine relationships and characteristics among standardized groups of data items. More particularly, it is desirable to afford an automated name standardization system and process that may be applied to big data, and it is to these ends that the present invention is directed.

DESCRIPTION OF PREFERRED EMBODIMENTS

The invention is well adapted for use in financial transaction processing involving big data, and, in particular, for automated standardization of merchant names in credit and debit transaction processing and will be described in that context. It will be appreciated, however, that this is illustrative of only one utility of the invention and that the invention has greater utility and applicability to other types of data processing.

Figure 1:
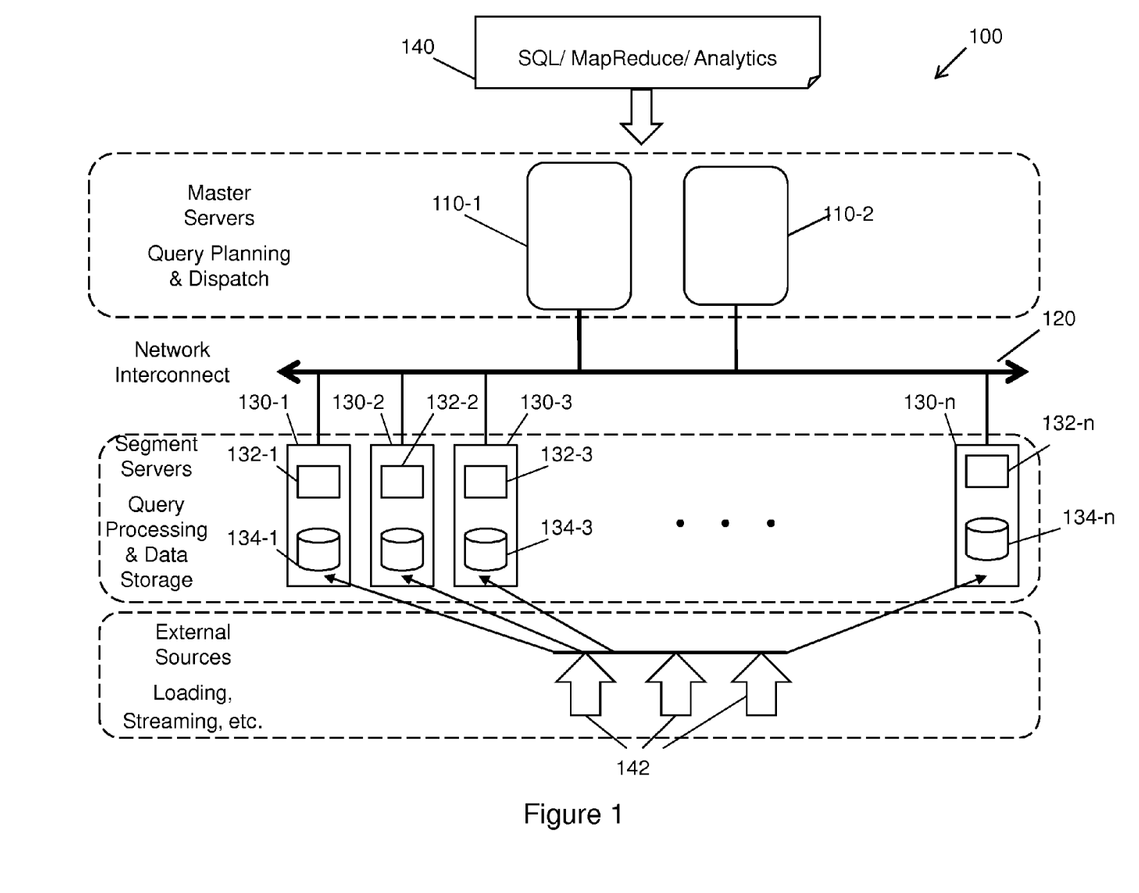
FIG. 1 is a block diagram illustrating the architecture of an MPP shared-nothing data processing system of a type with which the invention may be used.

FIG. 1 is a block diagram illustrating the architecture of a massively parallel processing ("MPP") shared-nothing data processing system 100 of a type with which the invention may be used. The system may be a Greenplum MPP distributed relational database system available from GoPivotal, Inc., of San Mateo, Calif., which is ideal for big data processing applications. As shown, the system may comprise one or more master server computer systems 110-1, 110-2 interconnected via a network interconnect 120 to plurality of distributed segments 130-1, 130-2, 130-3 . . . 130-n. The segments may all be substantially the same, comprising segment server computer systems 132-1, 132-2, 132-3 . . . 132-n and associated local data storage 134-1, 134-2, 134-3 . . . 134-n. Each master and segment server computer systems may comprise a single or multi-processor computer system with associated physical non-transitory memory and storage that store programmable instructions for controlling the computer systems. The master servers may store control programs such as SQL, MapReduce and other data analytics 140 for planning and dispatching queries to the distributed segments and for receiving, analyzing and reporting the results of the queries. One master server 110-1 may the primary controller of the system 100 and another master server 110-2 may be a redundant backup. The segments may similarly comprise single or multiprocessor computer systems that perform query and other processing under the control of a master server and provide data storage for data received from external sources 142. An advantage of the shared-nothing architecture of MPP system 100 is that the system is linearly scalable to thousands of nodes (segments). Each node adds additional storage and query processing. As such, the system 100 is well suited to transaction processing of big data.

As described above, name standardization in large data processing systems is a problem due the variability and lack of standardization in naming entities, resulting in multiple distinct non-standard names for the same entity. This requires preprocessing the non-standard names to standardize them for analysis and processing. The larger the size of the data, the larger the task. With big data, the problem is particularly acute. The invention addresses this problem in a preferred embodiment by providing an automated name standardization process that identifies distinct unstructured non-standard names in a large data set that refer to the same entity, and converts the distinct names to a standard form by cleaning and removing non-standard words, strings and characters in distinct name forms that create ambiguity and do not distinguish a name from other similar names that refer to the same entity. Fuzzy matching techniques may then used to identify possible matches among the cleaned "standard form" names and the identified matching names to standardize the names data set so that queries and analytics produce more complete, accurate and meaningful information. The invention in an embodiment may do this by developing a feature set for each distinct non-standard name, and applying a particular regular expression rule to the name based upon its feature set to remove certain ambiguous non-standard parts to "clean" the name and convert it to a "standard format". Similar cleaned names are grouped, and fuzzy matching processes may be applied to the groups that exceed a predetermined number to identify possible matches. The names identified as possible matches are converted to a common form. Each common form may be compared to a reference set of names of real entities to verify that the common form is a standard name. If necessary, the common form may be modified as appropriate so that it corresponds to actual standard name of the real entity. All occurrences of different distinct non-standard names found in the data set may be converted into the appropriate standardized formats to produce a standardized data set for further query and analytic processing.

Figure 2:
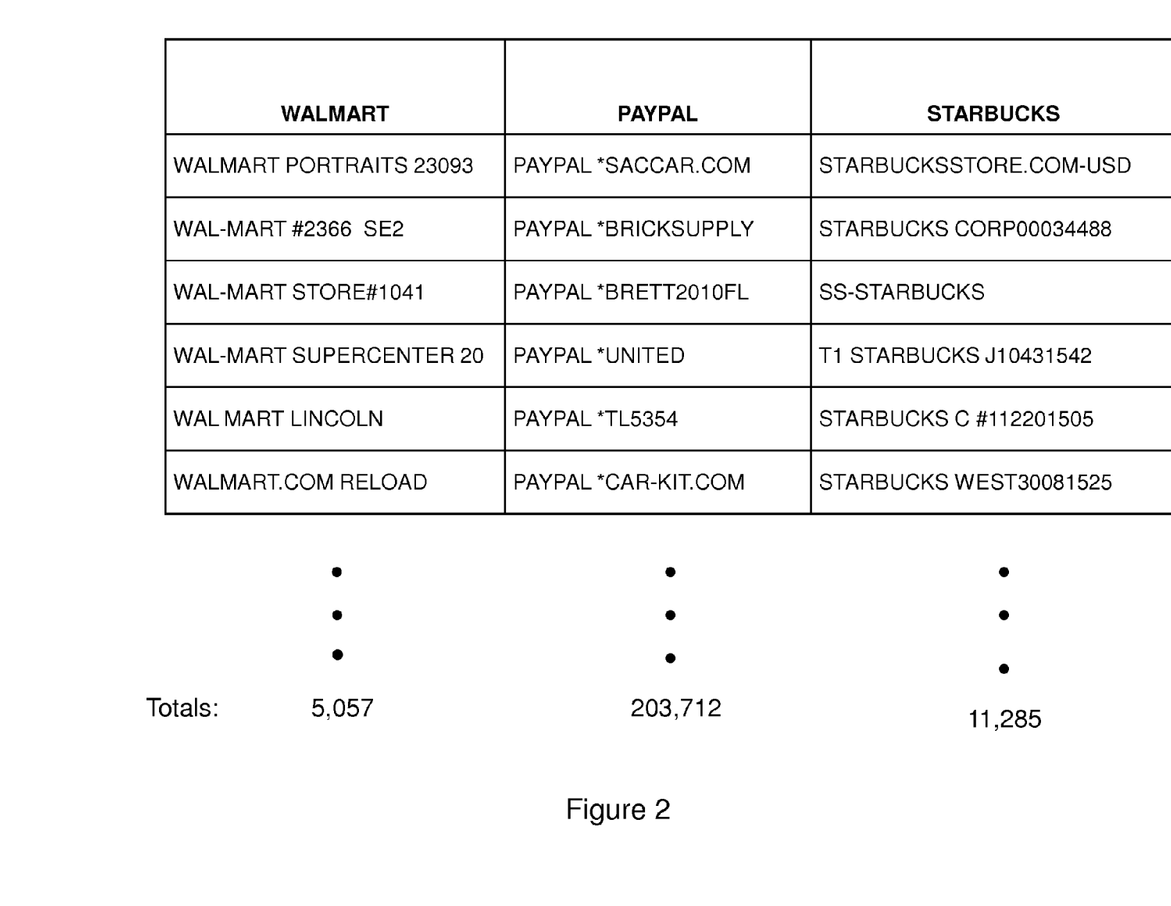
FIG. 2 is a diagrammatic view showing examples of distinct names for merchant entities such as may be found in a transaction processing database.

The invention will now be described in the context of automated standardization of merchant names in a nationwide or global wide relational database used for credit and debit financial processing of credit card transactions in the retail banking industry. FIG. 2 illustrates samples of the variability in non-standard names for three merchant entities, "WALMART", "PAYPAL" and "STARBUCKS" found in the data set on which the invention was tested. For this particular data set, there were 5,057 distinct name variations that referred to WALMART, 203,712 distinct name variations that referred to PAYPAL, and 11,285 distinct names variations that referred to STARBUCKS.

As is evident from FIG. 2, distinct merchant names are frequently used to label individual business locations, sub-locations such as departments within an individual business location, as well as to differentiate between online operations and physical locations. In the case of PAYPAL, distinct names may be used to identify the accounts of different individual PAYPAL members/clients. As shown in the figure, distinct, non-standardized merchant names for a single business entity may take many forms, and can comprise multiple formats of the same business name, truncated/shortened words, and special/alphanumeric characters in different positions. For analytics processing that requires a global view of an entire business entity, individual level labeling as shown is limiting and requires preprocessing of the data to identify location level labels that refer to the same overall entity. In order to aggregate merchant names of the same business into a single assignment, formatting differences require identification, standardization through cleanup, aggregation, and in some cases a final verification and correction to account for obscure and outlier differences. The invention affords automated preprocessing and standardization of distinct non-standard names to convert them into standard names.

Figure 3:
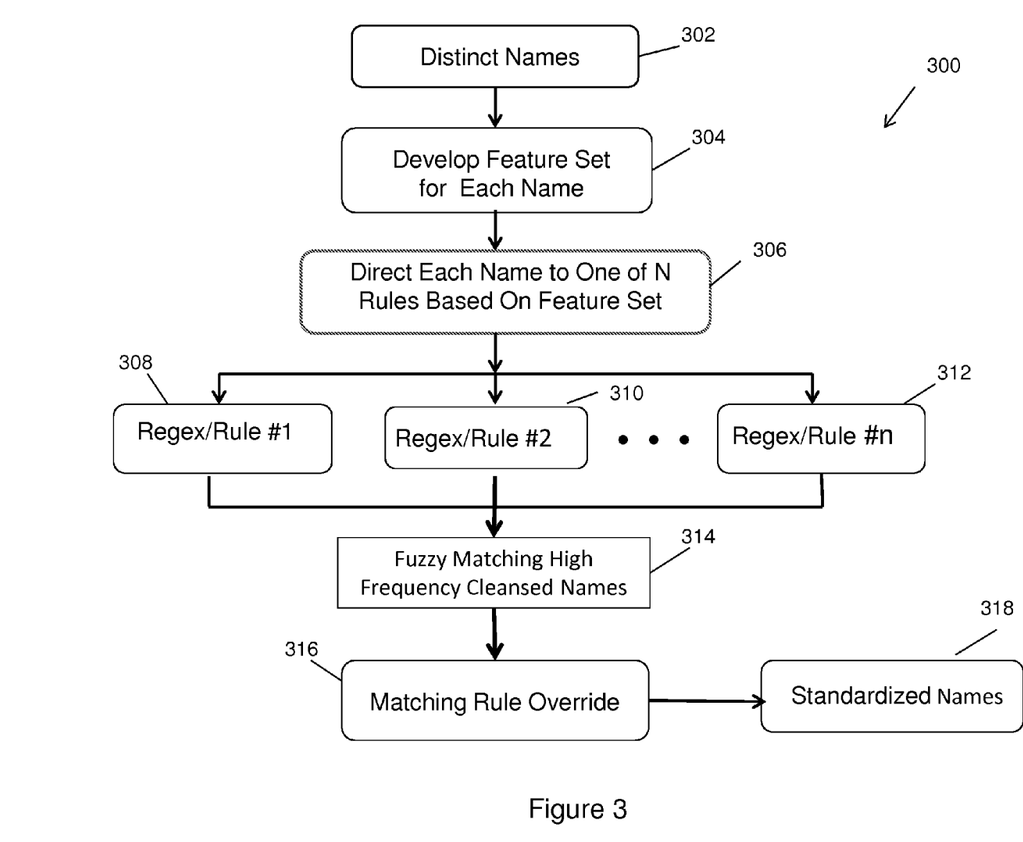
FIG. 3 is an overall block diagram of an automated name standardization process in accordance with the invention.

FIG. 3 is a block diagram illustrating an overview of an embodiment of a process 300 in accordance with the invention for automated name standardization of distinct names in a database to convert the distinct names to standard names. The process may be run in parallel on each segment of a distributed database such as illustrated in FIG. 1. The process comprises a sequence of stages or sub-processes that together identify and cleanse a name of non-standard or ambiguous features that are not useful for determining whether the name refers to the standard name of an entity in the database. The process ultimately cleanses and converts the names to the standard names.

Figure 4:
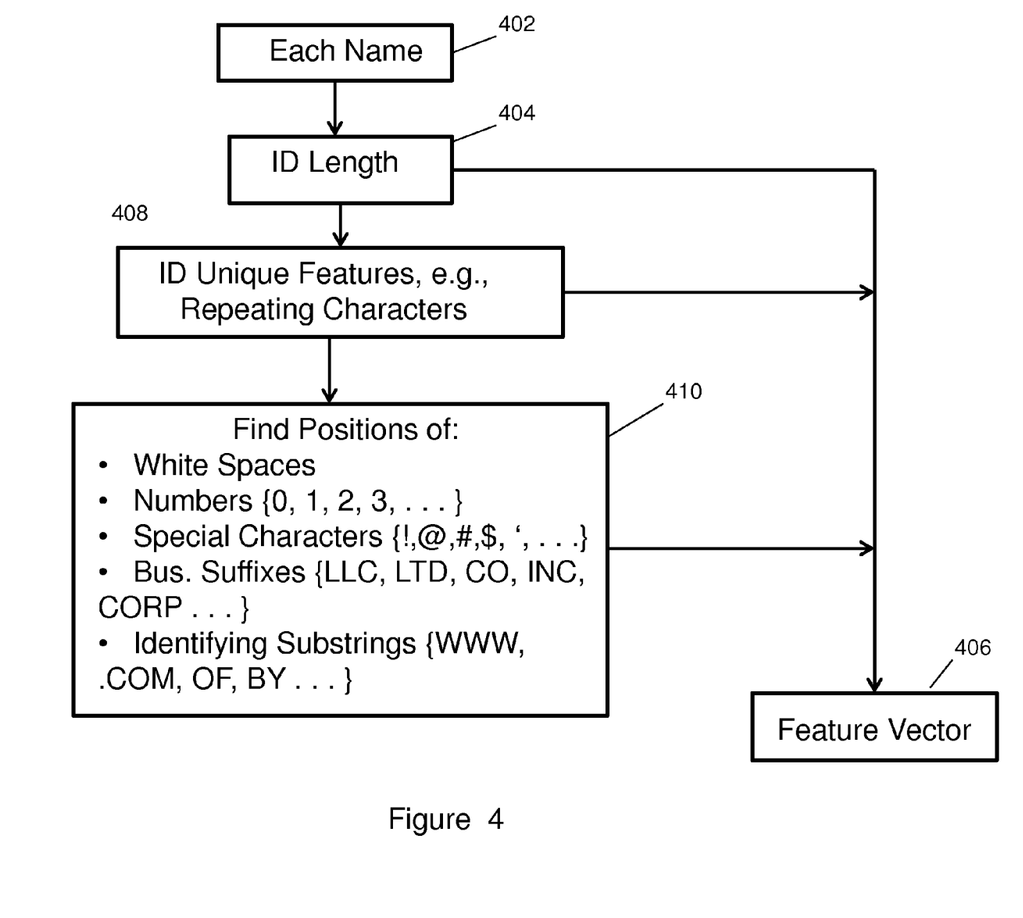
FIG. 4 is a block diagram of an embodiment of a feature identification process of FIG. 3.

Referring to FIG. 3, at 302 a distinct name is input to the process 300, as from a name field in a database record. In a first process stage 304, the process extracts a feature set that characterizes the name and may create a feature vector of the extracted features. The feature set comprises non-distinguishing features of the distinct name such as its length and other features such as common words, strings and characters in the distinct name that do not uniquely identify a particular entity, do not differentiate between different entities, or are not otherwise useful to identify a standard name of a particular entity. FIG. 4 illustrates a preferred embodiment of the first stage process 304 for extracting the feature set and creating an associated feature vector.

As shown in FIG. 4, for each name input at 402, the name may be scanned at 404 to identify its length, and the length value so identified may be inserted into a feature vector 406 for the name. The feature vector may comprise a record stored in the database that indicates the features that characterize the name. At 404, unique features of the name such as repeating or special characters may be identified and input into the feature vector. At 410, the name may be scanned to find the positions in the name of a white space, numbers such as {0, 1, 2, 3 . . . }, special characters such as {!, @, #, $ . . . }, business suffixes such as {LLC, LTD, CO, INC, CORP . . . } and identifying substrings such as {WWW, .COM, OF, BY . . . }, and these features may also be entered into the feature vector. A example of code that may be used by the segment servers to perform such identifications is:

-- Position the first whitespace (if exists)
, position(' ' IN original) AS x1
-- Position the first '*' (if exists)
, position('*' IN original) AS x2
-- Position 'WWW.' (if exists)
, position('WWW.' IN original) AS x3

Returning to FIG. 3, at 306 the distinct name may be processed by one of a plurality of N regular expression processes (rules) Regex/Rule #1 (308), Regex/Rule #2 (310) . . . Regex/Rule #N (312). Regular expressions (Regex) are a known mechanism for matching specific and recognized strings of characters, words and patterns of characters. Based upon the feature set stored in the feature vector for the name, the name may be processed by one of N regular expressions that identifies and cleans (removes) non-standard elements such as common strings and strings in the name that create ambiguity and do not assist in associating of the name with the standard name of an actual merchant. Examples of regular expression code and operations that may be used are:

$regex$\s[(?-i)a-z]{1,3}\d{1,}$|\s\d{1,2}[(?-i)a-z]{1,2}\d{1,}$$regex$

Identify whitespace ("s") followed by any sequence of 1-3 characters (a thru z) where case does not matter followed by any length sequence of digits ("d") (0-9) at the end of a string or whitespace followed by any sequence of 1-2 digits (0-9) followed by any sequence of 1-2 characters (a thru z) where case does not matter followed by any length sequence of digits (0-9) at the end of a string $regex$[^(?-i)a-z]{1,2}\s{1,}[(?-i)a-z]{1,}$$regex$ Identify any sequence of 1-2 characters (a thru z) where case does not matter followed by any 1 or more length of whitespace followed by any sequence of 1 or more characters (a thru z) where case does not matter at the end of string Regular expression rules such as those above identify and remove the matching non-standard elements from the distinct name that create ambiguity and do not assist in identifying the standard name of an entity to which the distinct name refers. The Regex rules produce "cleansed" names that are in a "standard form" by being free of the non-standard features. The cleansed names resulting from the regular expression processing on the segments may be sent to the master where the remainder of the process of FIG. 3 is performed.

The third stage 314 of the process seeks to match to a common (one) "standard form" name those of the most frequently occurring cleansed standard form names that are substantially the same and that number more than a certain predetermined threshold number, e.g., 170. The matching is preferably performed by the master node server using conventional fuzzy matching processes to identify possible matches among groups of similar cleansed standard form names resulting from the regular expression processing by the segments. Fuzzy matching processes attempt to match unstructured strings where there may be no direct one-to-one match and ambiguities exist in matching names. Setting a threshold so that fuzzy matching is conducted only for similar names that exceed a predetermined number, e.g., 170, is desirable for efficiency. It avoids the processing overhead for performing fuzzy matching on groups of small numbers of names that could be matched more efficiently manually. Other types of string matching algorithms that may be used instead of fuzzy matching include Levenshtein Distance, Soundex, Metaphone, and PPM.

During fuzzy matching all merchant names in process that occur more than the predetermined number of times are designated for fuzzy processing to identify possible matches. The following is an example of code that may be used for this:

```
-- Iterate thru total # of frequently occurring merchant
names
i:=1
WHILE i<=total LOOP
-- Insert all strings where freq. occurring exists in original
INSERT INTO_stdtbl4_
SELECT final2 AS_original_
  , Array1[i] AS_matched_
  , i AS_row_
FROM stdtbl2
WHERE final2~Array1[i]=TRUE;
-- Print progress to log
GET DIAGNOSTICS print=ROW_COUNT;
RAISE NOTICE 'Inserting % matches of (%) on iteration
   % of %', print,
Array1[i], i, total;
i:=i+1;
END LOOP;
```

Identified possible matches may be algorithmically filtered to keep only the most likely possibilities based upon comparison of string lengths. An example of the decision logic is:

if length >x then
  if length(freq_occur)/length (original)>=y & length(freq_occur) !=length (original) then match
where
X is a number in the set {4,5,6,7,8,9,10}
y is an arbitrary number that exists in (0,1); picked based on the output results.
An example of decision logic that may be used is:

WHERE  (length2/length1::decimal  >=0.40  AND length1!=length2 AND length2>10)
OR  (length2/length1::decimal  >=0.45  AND length1!=length2AND length2>9)
OR  (length2/length1::decimal  >=0.50  AND length1!=length2AND length2>8)
OR  (length2/length1::decimal  >=0.55  AND length1!=length2AND length2>7)
OR  (length2/length1::decimal  >=0.70  AND length1!=length2AND length2>6)
OR  (length2/length1::decimal  >=0.80  AND length1!=length2AND length2>5)
OR  (length2/length1::decimal  >=0.90  AND length1!=length2AND length2>4)

The output of the fuzzy matching step 314 may be then verified through inspection, and an override applied to the matched output results at 316, if necessary. The override can be applied to handle one-off and special cases in the output results that are incorrect. For example, some merchants may have a standard name that includes special characters or numbers, such as, for example, "7-ELEVEN". The first three stages of the automated standardization process just described will incorrectly standard the name "7-ELEVEN" to "ELEVEN". Thus, it is desirable to override the output result to change the standard name output at 318 to reflect the actual merchant name "7-ELEVEN". This may be done either manually or automatically, with or without manual verification, by comparing the output results to a list of "correct" standard names and replacing an incorrect standard name with a correct standard name.

Figure 5:
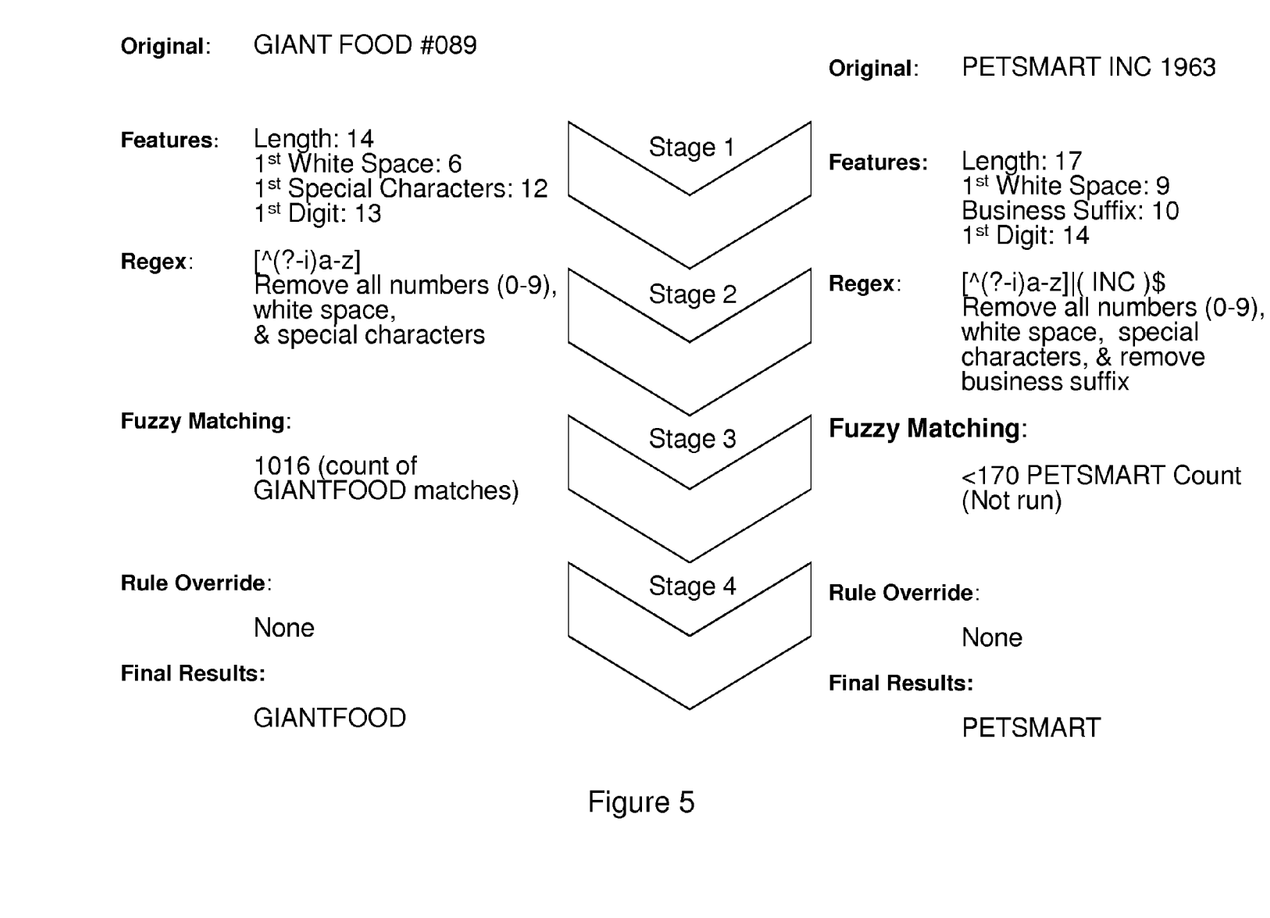
FIG. 5 is a diagrammatic view giving two examples of the application of the process of FIG. 3.

FIG. 5 illustrates two examples of the process of FIG. 3 applied to two different distinct merchant names. The first example is for original distinct name "GIANT FOOD #089" in the database. The second example is for "PETSMART INC 1963". Following stage 1 of the process, the extracted feature set for GIANT FOOD #089 will indicate that the name has a length of 14 (the number of character positions in the name); the first white space is at position 6; the first special character is at position 12; and the first number (digit) is at position 13. For PETSMART INC 1963, the length of the name is 17; the first white space is at position 9; the first business suffix is at position 10; and the first number (digit) is at position 14. At Regex processing at stage 2, the numbers, the white space, special characters, and business suffixes spaces are removed. This results in outputs to the fuzzy matching of stage 3 of GIANTFOOD and PETSMART for these two examples. For the particular credit card transaction dataset used for testing, there were 1016 matches of GIANTFOOD found, but fewer than 170 matches of PETSMART. Accordingly, fuzzy matching was applied to GIANTFOOD, but not to PETSMART. Since these are the standard names of actual merchants, no rule overrides were applied to either, and GIANTFOOD and PETSMART were output as the final results.

The invention as described herein was tested on a retail credit card transaction database comprising data for 113.2 million transactions and over 3.2 million distinct merchant names. After 500 iterations and in less than 5 minutes, the automated name standardization process of the invention consolidated and reduced the list of distinct merchant names to about 1.1 million. After standardization and consolidation, queries and analytics may be run on the data to characterize it and derive useful information.

As can be appreciated from the foregoing, the automated name standardization process of the invention has a number of advantages. It is fast and efficient, easily scalable, easily modified and is readily transferable from one application to another. It can quickly and automatically standardize and reduce a set of non-standard distinct names for an entity to a smaller set of standard names that is more amenable to analysis and query. As will also be appreciated, although the foregoing description has been with reference to particular preferred embodiments of the invention, changes to these embodiments may be made without departing from the principles and spirit of the invention, the scope of which is defined by the appended claims.

The invention claimed is:

1. A computer-implemented method of automated standardization of distinct non-standard names in a transactions processing database to associate said distinct non-standard names with standard names of particular entities, comprising:
   identifying features of a distinct name that are non-standard features of a standard name of an entity stored in said database, the non-standard features creating ambiguity between the distinct name and the standard name, and creating a characteristic feature set for said distinct name containing said identified non-standard features;
   processing said distinct name using a regular expression rule selected based upon the characteristic feature set of said distinct name to cleanse said distinct name by removing the non-standard features of the characteristic feature set from the distinct name to convert the distinct name to a standard name format;
   comparing the standard name format to standard names of entities in the database to determine possible matches; and
   identifying based upon said comparing the distinct name as corresponding to the standard name of the entity.

2. The method of claim 1, wherein said non-standard features comprise a length of the distinct non-standard name and repeating characters, if any.

3. The method of claim 1, wherein said non-standard features comprise a position of one or more of a white space, numbers, and special characters, if any.

4. The method of claim 1, wherein said entity is a business, and said non-standard features comprise a business identifying suffix or substring.

5. The method of claim 1 further comprising forming a plurality of regular expression rules, each rule being formed to correspond to a different predetermined set of non-standard features, and said processing comprising processing said distinct name using a selected regular expression rule tailored to the non-standard feature set of said distinct name.

6. The method of claim 5, wherein said regular expression rules are formed to identify in said distinct name non-standard features that create said ambiguity and do not uniquely identify the standard name of a said entity.

7. The method of claim 5, wherein said processing comprises removing from said distinct name all of the features in the feature set of said distinct name to convert the distinct name to said standard name format.

8. The method of claim 1, wherein said comparing comprises determining a count of other stored standard name formats in said database that are substantially similar to said standard name format of said distinct name, and matching said distinct name to a most frequently occurring standard name format.

9. The method of claim 8, wherein said matching comprises, upon the count of said other standard name formats exceeding a predetermined number, fuzzy matching said standard name format to the standard names to identify a matching standard name, and assigning the matching standard name to said distinct name as the standard name of said entity.

10. The method of claim 9 further comprising, prior to said assigning, verifying that said matching standard name corresponds to a correct standard name of said entity, and correcting for any differences between the matching standard name and the correct standard name.

11. A computer readable non-transitory storage medium for storing executable instructions for controlling a computer to perform automated standardization of distinct names in a transactions processing database to associate said distinct names with standard names of particular entities, comprising instructions for:
   creating a characteristic feature vector for features of a distinct name that are non-standard features of a standard name of an entity stored in said database, said non-standard features creating ambiguity between the distinct name and the standard name;
   processing said distinct name using a regular expression rule selected based upon the feature vector of said distinct name to cleanse said distinct name by removing the non-standard features of the feature vector from the distinct name to convert the distinct name to a standard name format;
   comparing the standard name format to standard names of entities in the database to determine possible matches; and
   identifying based upon said comparing the distinct name as corresponding to the standard name of the entity.

12. The non-transitory storage medium of claim 11 further comprising instructions for forming a plurality of regular expression rules, each rule being formed to correspond to a different predetermined set of non-standard features, and said processing comprising processing said distinct name using a selected regular expression rule tailored to the non-standard feature vector of said distinct name.

13. The non-transitory storage medium of claim 12, wherein said regular expression rules are formed to identify in said distinct name non-standard features that create said ambiguity and do not uniquely identify the standard name of the entity.

14. The non-transitory storage medium of claim 12, wherein said processing comprises removing from said distinct name all of the features in the feature vector to convert the distinct name to said standard name format.

15. The non-transitory storage medium of claim 11, wherein said comparing comprises determining a count of other standard name formats in said database that are substantially similar to said standard name format of said distinct name, and matching said distinct mane to a most frequently occurring standard name format.

16. The non-transitory storage medium of claim 15, wherein said matching comprises, upon the count of said other standard name formats exceeding a predetermined number, fuzzy matching said standard name format to the standard names to identify a matching standard name, and assigning the matching standard name to said distinct name as the standard name of said entity.

17. The non-transitory storage medium of claim 16 further comprising, prior to said assigning, verifying that said matching standard name corresponds to a correct standard name of said entity, and correcting for any differences between the matching standard name and the correct standard name.

18. The non-transitory storage medium of claim 17, wherein said verifying comprises comparing said matching standard name to a list of correct standard names of entities in said database.

* * * * *